(12) United States Patent
Hancock

(10) Patent No.: US 10,575,506 B2
(45) Date of Patent: *Mar. 3, 2020

(54) LURE

(71) Applicant: RMB Importing, LLC, Fort Atkinson, WI (US)

(72) Inventor: Robin Hancock, Elkhorn, WI (US)

(73) Assignee: RMB Importing, LLC, Fort Atkinson, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/281,175

(22) Filed: Feb. 21, 2019

(65) Prior Publication Data

US 2019/0335733 A1 Nov. 7, 2019

Related U.S. Application Data

(63) Continuation of application No. 15/970,654, filed on May 3, 2018, now Pat. No. 10,244,741.

(51) Int. Cl.
*A01K 85/01* (2006.01)
*A01K 85/16* (2006.01)

(52) U.S. Cl.
CPC .............. *A01K 85/01* (2013.01); *A01K 85/16* (2013.01)

(58) Field of Classification Search
CPC ......... A01K 85/00; A01K 85/01; A01K 83/06
USPC .... 43/42.39, 42.24, 44.8, 44.2, 42.31, 42.37
See application file for complete search history.

(56) References Cited

U.S. PATENT DOCUMENTS

| | | |
|---|---|---|
| 3,750,321 A | 8/1973 | McClellan |
| 3,855,722 A | 12/1974 | Moore |
| 3,881,272 A | 5/1975 | Parker |
| 3,909,974 A | 10/1975 | Kent |
| 4,045,903 A | 9/1977 | Parker |
| 4,712,326 A | 12/1987 | Hoover |
| 4,785,569 A | 11/1988 | Thomas |
| 4,791,750 A | 12/1988 | Gammill |
| 4,807,383 A | 2/1989 | Delwiche |
| 5,588,246 A | 12/1996 | Hill |
| 5,806,234 A | 9/1998 | Nichols |
| 5,918,405 A | 7/1999 | Marusak |
| 5,926,993 A | 7/1999 | Marusak |
| 5,926,994 A | 7/1999 | Mason |
| 5,946,847 A | 9/1999 | North |
| 6,061,948 A | 5/2000 | Boucek |
| 6,212,818 B1 | 4/2001 | Huddleston |
| 6,651,376 B1 | 11/2003 | Link |

(Continued)

FOREIGN PATENT DOCUMENTS

FI 61388 B 4/1982

OTHER PUBLICATIONS http://web.archive.org/web/20150923000105/http://www.fleetfarm.com/detail/southern-pro-tackle-rattle-eye-jigorange/0000000090151; website screenshot for the Southern Pro Tackle Rattle Eye Jig Orange; Sep. 23, 2015.

(Continued)

*Primary Examiner* — Magdalena Topolski

(74) *Attorney, Agent, or Firm* — Shane Delsman; Godfrey & Kahn, S.C.

(57) ABSTRACT

A lure having a hook and a tube extending through the body with at least one noise making element within the tube. As the lure moves in the water, the noise making element creates noise and vibrations and the appearance of a moving eye to attract fish to the lure.

17 Claims, 12 Drawing Sheets

(56) References Cited

U.S. PATENT DOCUMENTS

| | | | |
|---|---|---|---|
| 6,675,526 B1 | 1/2004 | Baron | |
| 7,614,178 B2 | 11/2009 | Hoyt | |
| 7,827,730 B1 | 11/2010 | Jensen | |
| 8,316,576 B1 | 11/2012 | Brown | |
| 8,601,737 B2 | 12/2013 | Beer | |
| 8,910,415 B2 | 12/2014 | Farr | |
| 2003/0074829 A1 | 4/2003 | Brinkman | |
| 2005/0223620 A1 | 10/2005 | Pixton | |
| 2006/0042147 A1 | 3/2006 | Jenkins | |
| 2006/0075678 A1 | 4/2006 | Schammel et al. | |
| 2006/0174535 A1 | 8/2006 | Beer | |
| 2006/0260178 A1 | 11/2006 | Jones | |
| 2009/0113783 A1 | 5/2009 | Hollomon | |
| 2009/0277071 A1 | 11/2009 | Harris | |
| 2010/0000145 A1 | 1/2010 | Leppala | |
| 2010/0229453 A1 | 9/2010 | Cunningham | |
| 2010/0263259 A1 | 10/2010 | Cuthbert | |
| 2013/0152450 A1 | 6/2013 | Myerson et al. | |
| 2015/0047247 A1 | 2/2015 | Cooper | |
| 2016/0113257 A1 | 4/2016 | Harrington | |
| 2018/0042206 A1* | 2/2018 | St. John | A01K 85/00 |
| 2019/0008128 A1* | 1/2019 | Walsh | A01K 85/00 |

OTHER PUBLICATIONS http://web.archive.org/web/20150923000105/http://www.basspro.com/Bass-Pro-Shops-Tourny-Rattle-Bait/product/10225063/; website screenshot for the Bass pro Shops Tourny Rattle Bait; Jan. 9, 2012.

https://allsharktankproducts.com/shark-tank-products-sports/the-world-striper-company-fishing-lures-andtackle/; website screenshot for the Fishing Lures and Tackle; May 19, 2015.

\* cited by examiner

LURE

CROSS REFERENCE TO RELATED APPLICATION

This continuation application claims the benefit of and priority to U.S. application Ser. No. 15/970,654, filed May 3, 2018, the disclosure of which is hereby incorporated by reference, herein, in its entirety, for all purposes.

FIELD OF THE INVENTION

The present invention relates generally to the field of fishing. More particularly, the present invention relates to the field of lures.

BACKGROUND

Lures are used by fishing hobbyists and professionals to catch fish. Lures come in a wide variety of shapes, sizes and configurations and can often be relatively inexpensive. Further, lures are versatile in that they can be tailored to attract a particular type of fish by changing one or more characteristics, for example, the shape or size.

Another characteristic that may attract a fish is how lifelike the lure appears to a fish. One aspect of a lure that can make the lure appear lifelike is the eyes of the lure. One attempt to create a lifelike eye in the fishing industry, as seen in United States Patent Publication Number 2009/0277071, was to use a hologram, glitter or other surface application to make the eye look three dimensional. As the lure and eye moves in the water, the light will reflect off of the eye in different directions making the eye appear to move. However, the use of such surface applications lose their affect in low light conditions and can be partially or wholly scrapped off during use, e.g. fish strikes or by contacting something hard.

Another aspect of a lure that can make the lure appear lifelike is the sound and/or vibrations it makes. Some prey, e.g. invertebrates, sought after by fish, e.g. bass, make sounds and vibrations in the water that fish use to locate such prey. Some lures use rattles to mimic the sound and vibrations created by such prey to attract the sought after fish. Therefore, a need exists for a lure with lifelike eyes that also produces sound and vibrations.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

DETAILED DESCRIPTION

Figure 1:
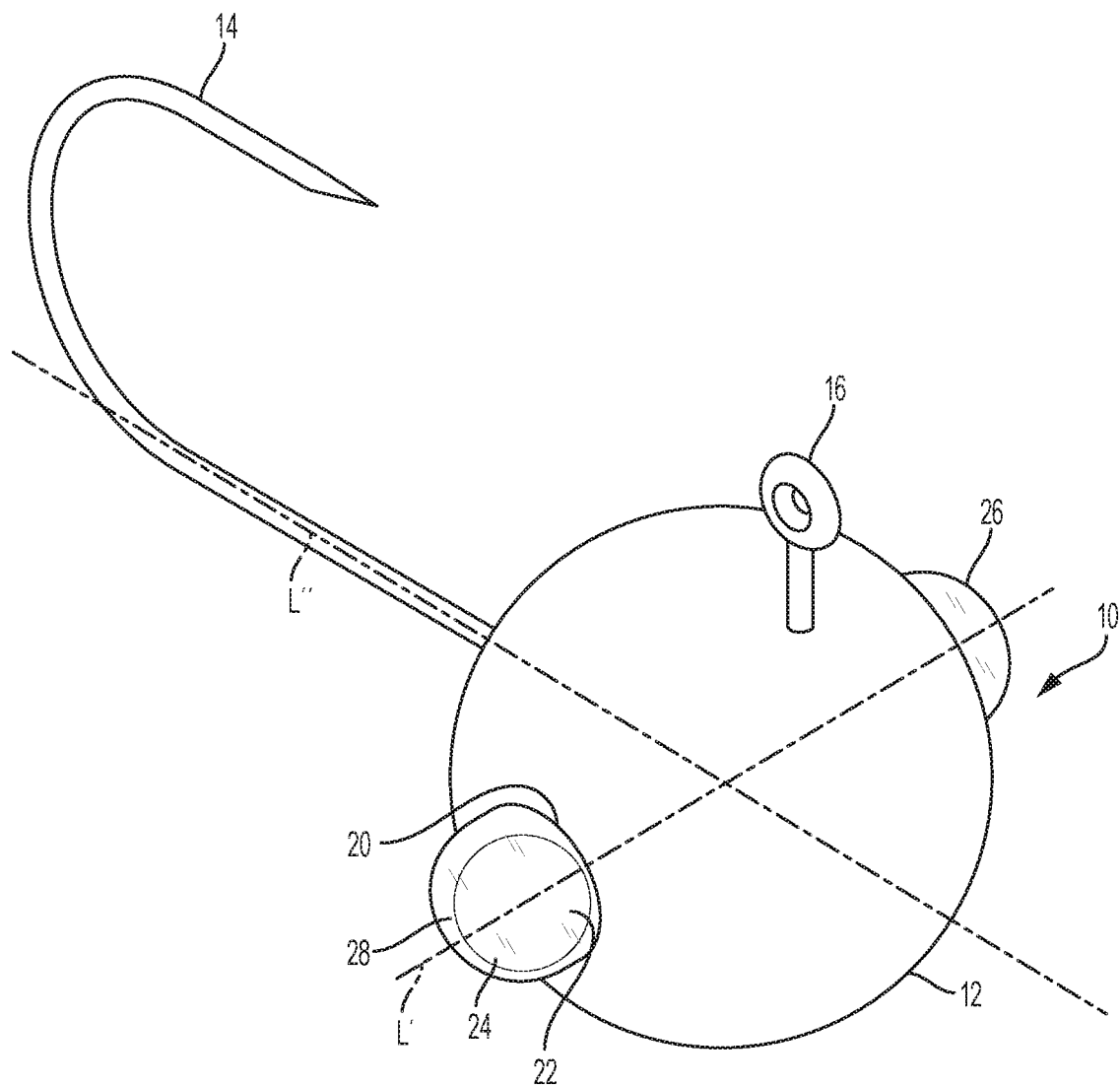
FIG. 1 is a perspective view of one embodiment of a lure.
Figure 2:
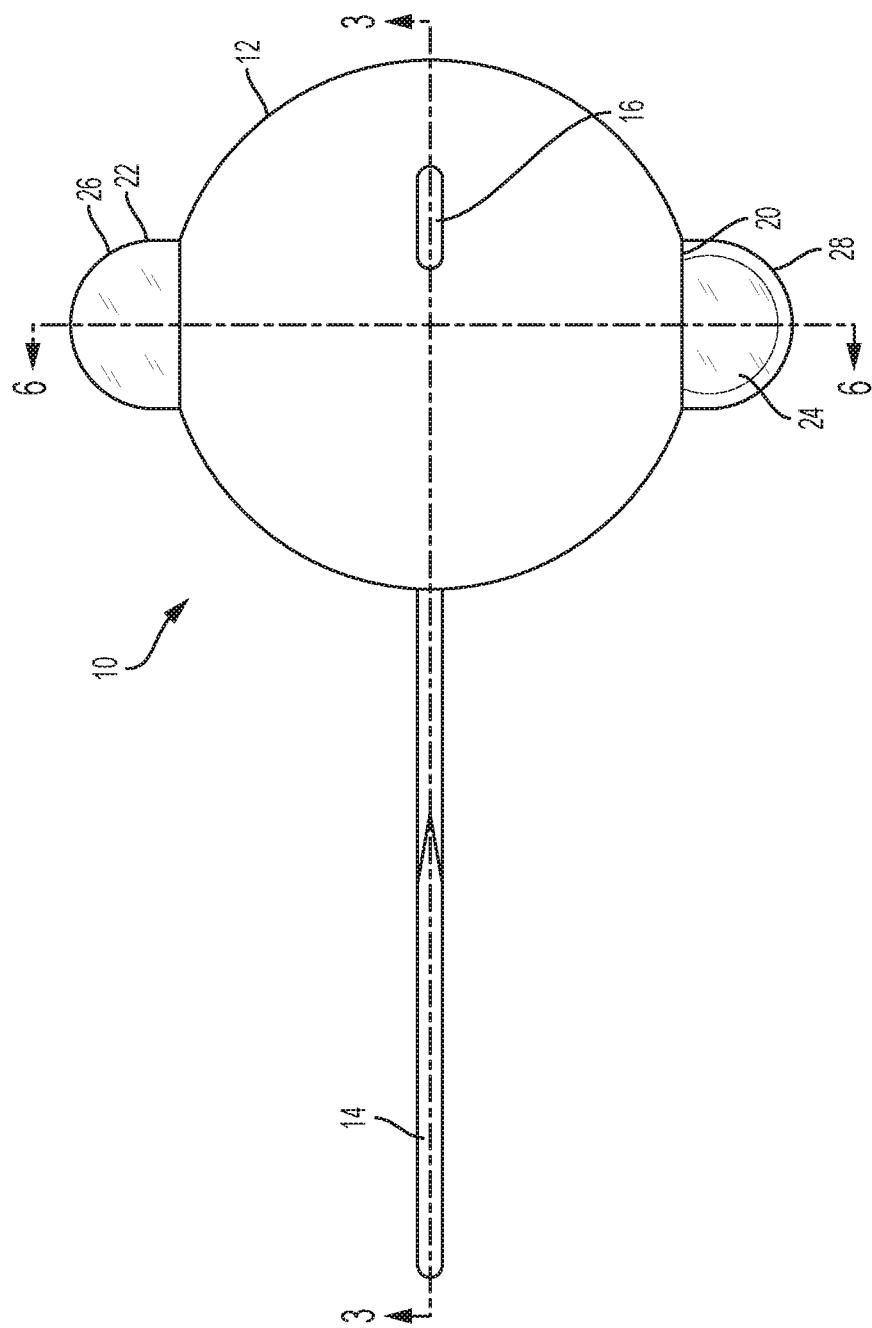
FIG. 2 is a top plan view of the lure in FIG. 1.
Figure 3:
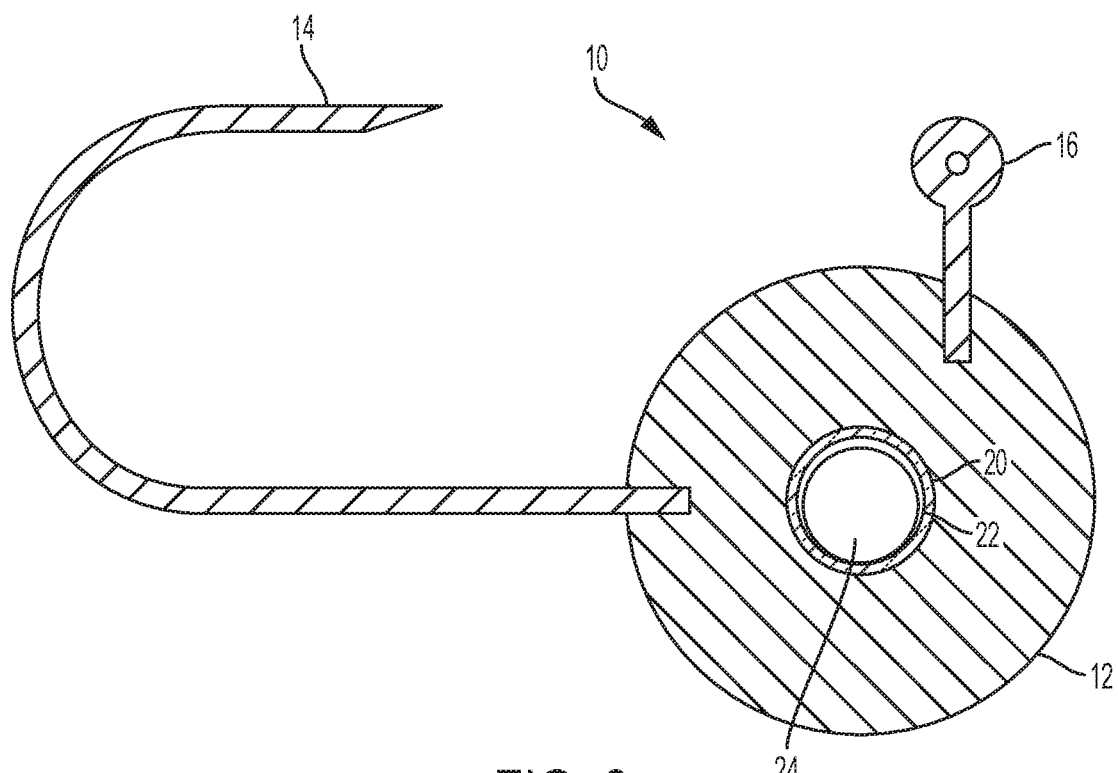
FIG. 3 is a side cross-sectional view of the lure of FIG. 2 taken from the line 3-3.
Figure 4:
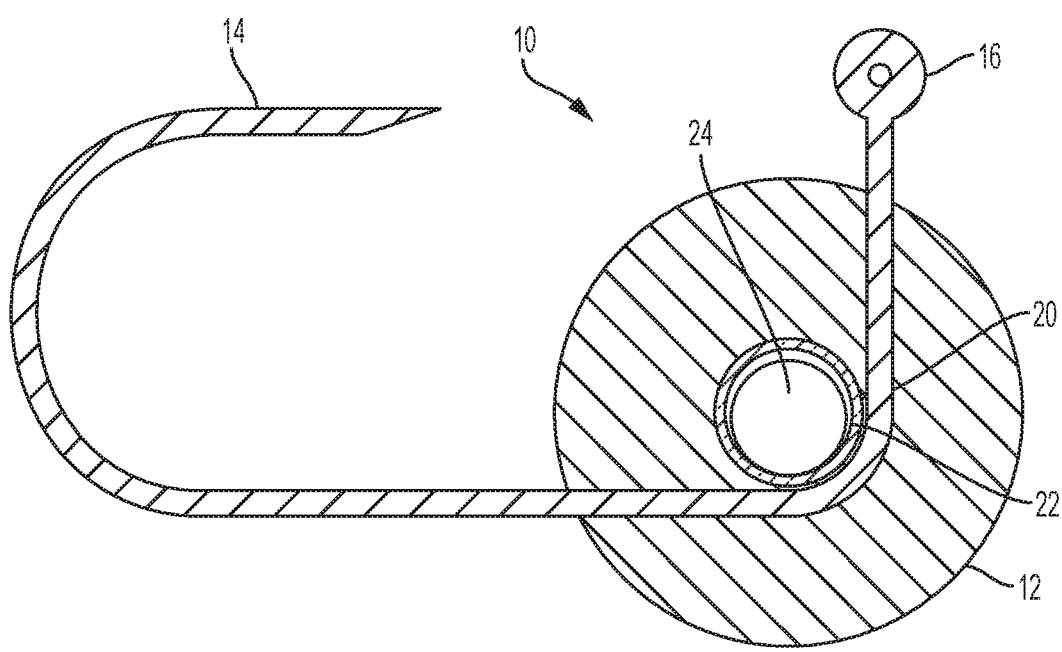
FIG. 4 is a side cross-sectional view of an alternative embodiment of the lure in FIG. 3.
Figure 5:
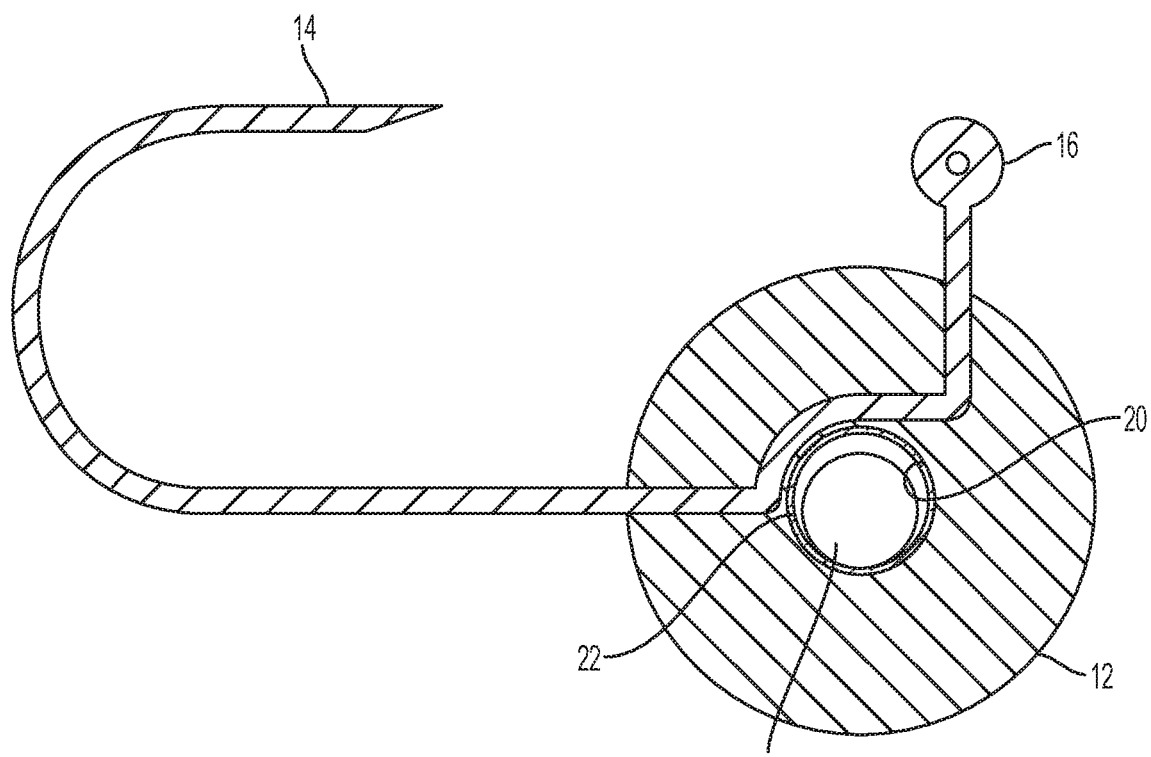
FIG. 5 is a side cross-sectional view of another alternative embodiment of the lure in FIG. 3.

As shown in FIGS. 1-2, a lure 10, for example a jig, includes a head or body 12 and a hook 14 and eyelet 16 connected or attached to the head. The hook 14 can be attached to the head by a shank. The eyelet 16 can be used to attach the lure 10 to fishing line. As seen in FIGS. 4-5, the hook 14 and eyelet 16 can be formed from the same member, e.g. metal wire, can be separate components (for example a first piece of material and a second piece of material) and attached to or embedded in the head 12 as seen in FIG. 3 or integrally formed with the head. In FIGS. 4-5 the wire forms an arcuate section or bend around the hollow and/or sealed tube 22. In FIG. 4, the bend is a 90 degree quarter bend and the tube 22 is positioned above the bend. In FIG. 5, the bend is an inverted 90 degree quarter bend and the tube 22 is positioned below the bend.

The head 12 embodiment seen in FIG. 5 has a hole or bore 20 formed therein and in which a tube 22 is located. The hole seen in FIG. 5 extends from a first side of the head 12 to the second side of the head. The tube 22 can include one or more noise making elements 24, e.g. ball bearings, that make a noise and vibration when they contact each other or the ends of the tube. In one embodiment, as seen in FIG. 1, the longitudinal axis L' of the tube 22 is generally perpendicular to the longitudinal axis L" of the hook 14. Although the bore and tube are shown in FIGS. 1-5 as having a cylindrical profile or shape, the tube and bore could be of any shape, e.g. square, without defeating the spirit of the invention. Also, although the noise making elements are shown as spherical, they could be of any desired shape, e.g. oblong, irregular, etc., without defeating the spirit of the invention.

In the embodiment seen in FIG. 1, the ends 26, 28 of the tube 22 are hemispherical in shape to mimic the shape of a fish eye and help reduce the likelihood of the ends causing the lure 10 to become snagged. The ends 26, 28 of the tube 22 seen in the embodiment in FIG. 1 also extend outwardly from or beyond the profile of the head 12 on the sides of the head to further mimic the shape of a fish eye. However, the ends 26, 28 could be of any shape, e.g. oblong, irregular, etc., and extend or not extend from the head 12 without defeating the spirit of the invention.

Figure 6:
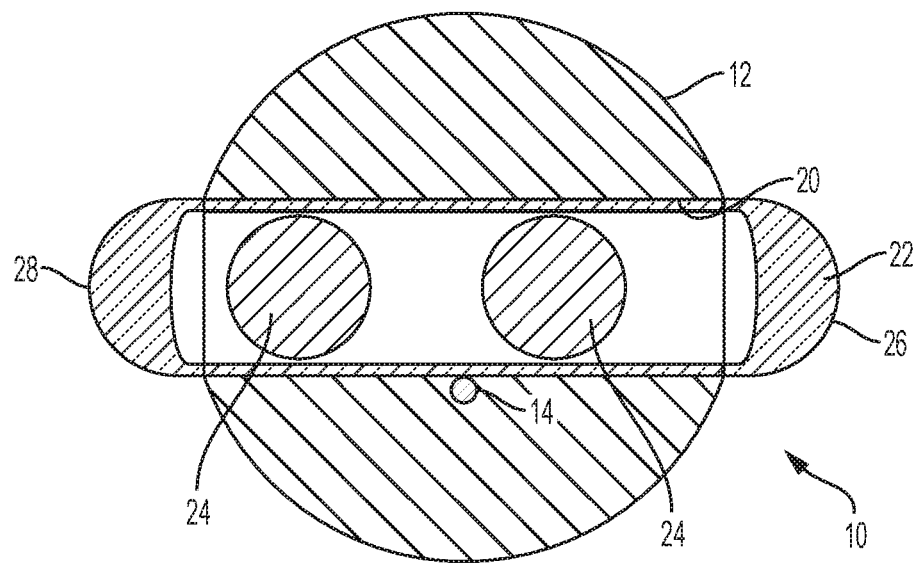
FIG. 6 is a front cross-sectional view of the lure of FIG. 2 taken along the line 6-6.
Figure 7:
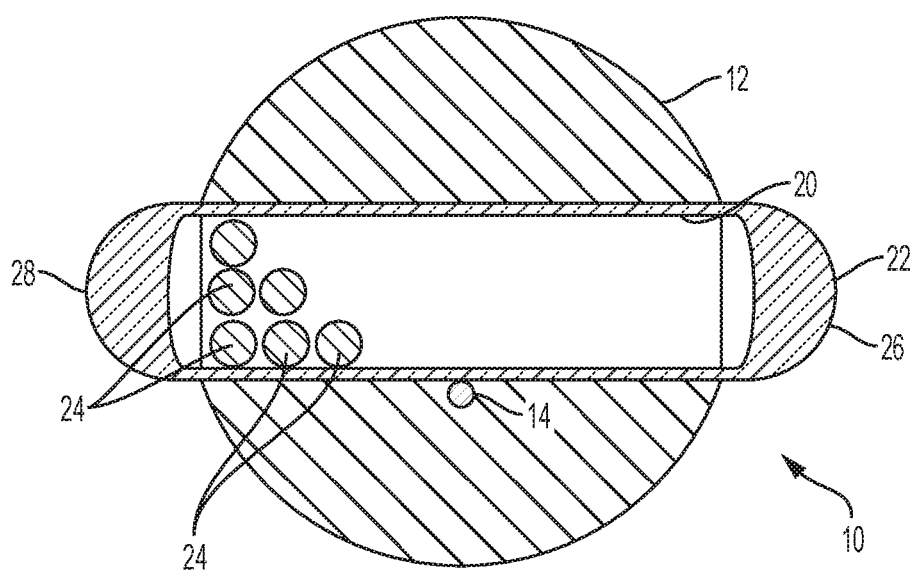
FIG. 7 is a front cross-sectional view of an alternative embodiment of the lure in FIG. 6.

In the embodiment seen in FIG. 7, the tube 22 is made from glass and includes two balls 24. The diameter of the balls 24 are sized just slightly smaller than or generally about the same size as the interior cavity of the tube 22 to decrease the impact of the balls with the sides of the tube and to inhibit the balls from breaking the tube. The balls 24 being sized slightly smaller than the tube 22 also gives the lure 10 the appearance of having lifelike eyes as the balls move into and out of the ends 26, 28. Two balls 24 are used in the embodiment seen in FIG. 6 to decrease the momentum that can be developed by the balls when traveling from one end of the tube 22 to the other and inhibit the balls from breaking the tube. As seen in FIG. 6, the balls are sized such that the first ball must remain between the first end and the second ball.

In one embodiment seen in FIG. 6, the thickness of the material forming the ends 26, 28 of the tube 22 or first thickness is increased or greater than the thickness of the material on a side of the tube or second thickness, e.g. between the ends, to further inhibit the ball(s) 24 from breaking the tube. However, more (as seen in FIG. 6) or less than two balls 24 could be used and the balls could be smaller or of varying sizes without defeating the spirit of the invention.

Glass is used in the embodiment seen in FIG. 7 because the contact between the balls 24 and the ends 26, 28 of the tube 22 results in sufficient sound and vibration to attract fish. The iridescence of the glass also helps the eyes appear more lifelike. However, the tube 22 could be made from any material that allows or permits at least some light through the material, e.g. translucent, transparent, clear, etc., such that the ball(s) 24 can be seen, is visible, or is otherwise observable through the material when one or more ball 24 is located or positioned in or near the ends 26, 28, e.g. plastic such as polycarbonates, without defeating the spirit of the invention.

As the lure 10 is used while fishing, e.g. allowed to sink to the bottom and pulled up off of the bottom of the water bed, the ball(s) 24 will rotate into and out of the ends 26, 28 of the tube 22. When the balls 24 contact each other or the ends 26, 28 of the tube 22 a rattle sound and vibration will be created. The movement of the balls 24 rotating into and out of the ends 26, 28 of the tube also make the lure 10 appear to have eyes that are moving. The movement of the eyes together with the rattle sound and vibrations attract fish.

The combination of a tube 22 and ball(s) 24 can be used with a variety of lures. For example, in addition to the round ball, waco or crappie jig shown in FIGS. 1-7 and 13-14, the tube 22 and ball(s) 24 can be used in a football jig 30 as seen in FIG. 8, a bullet jig 32 as seen in FIG. 9, a swimbait or darter head jig 34, which looks like the head of a fish, as seen in FIG. 10, swim jig 36 seen in FIG. 11; crank baits 40 as seen in FIG. 12, vibe baits, chatter baits and many other lures.

Figure 8:
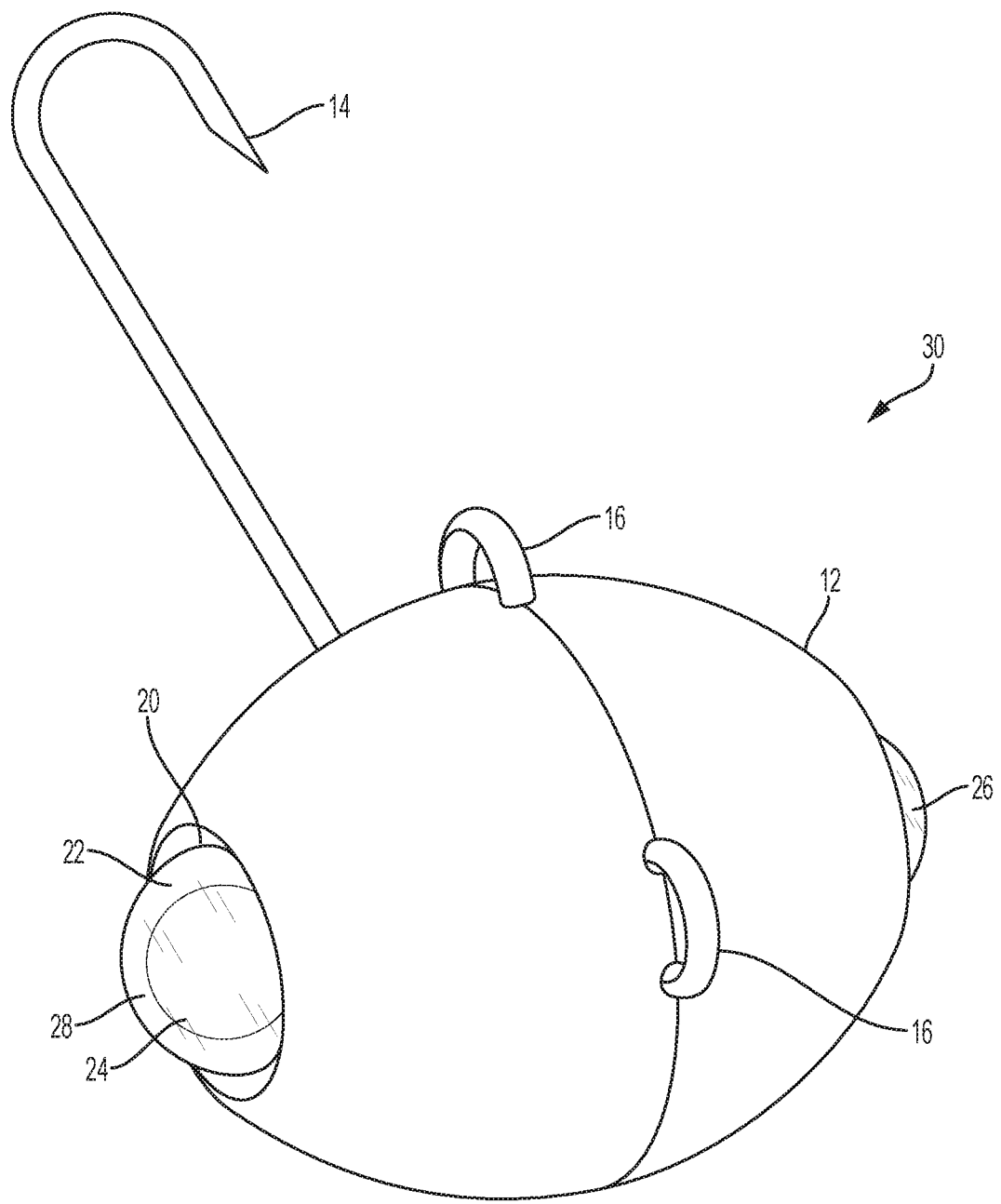
FIG. 8 is a perspective view of an alternative embodiment of a lure.
Figure 9:
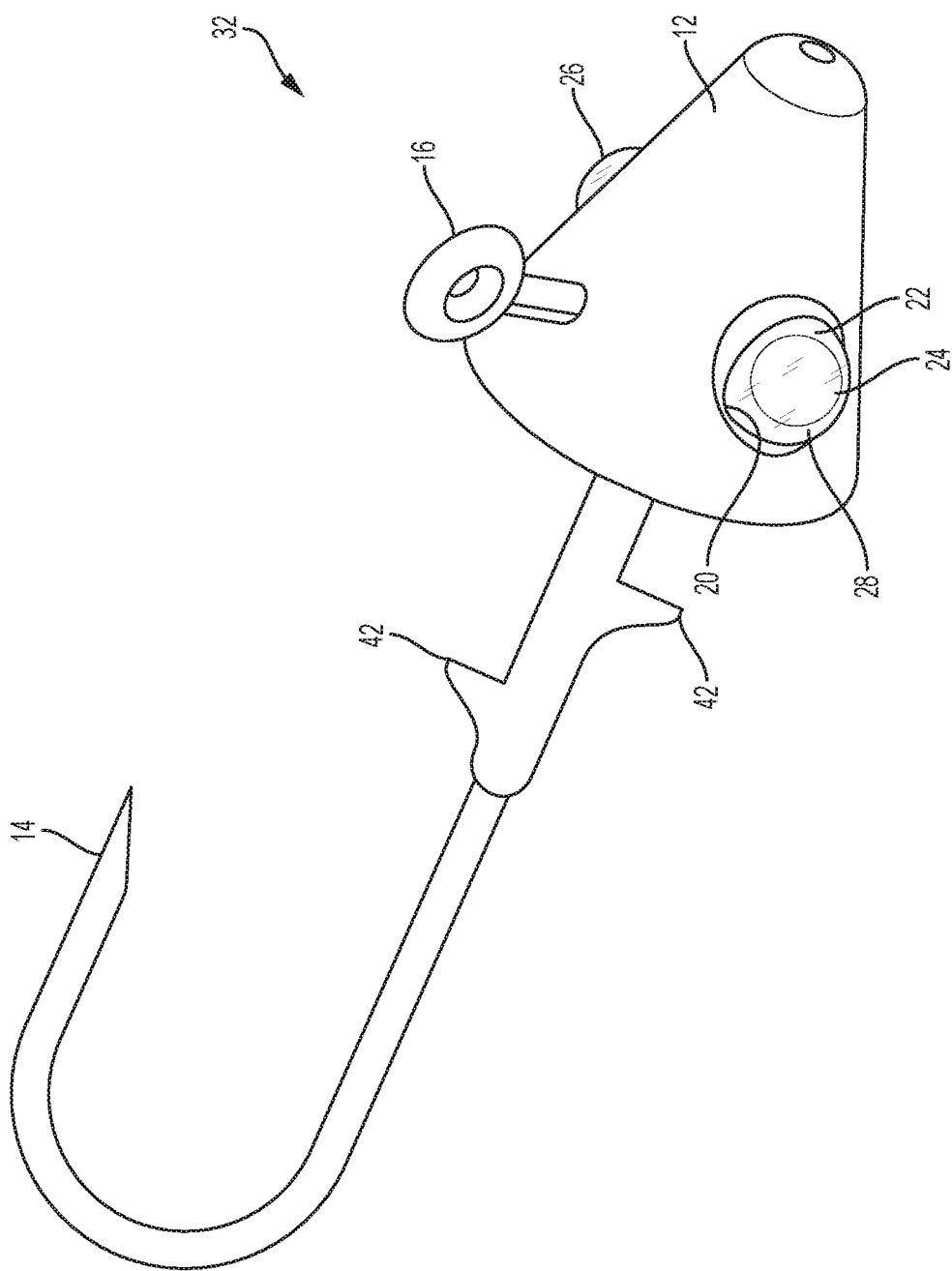
FIG. 9 is a perspective view of another alternative embodiment of a lure.
Figure 10:
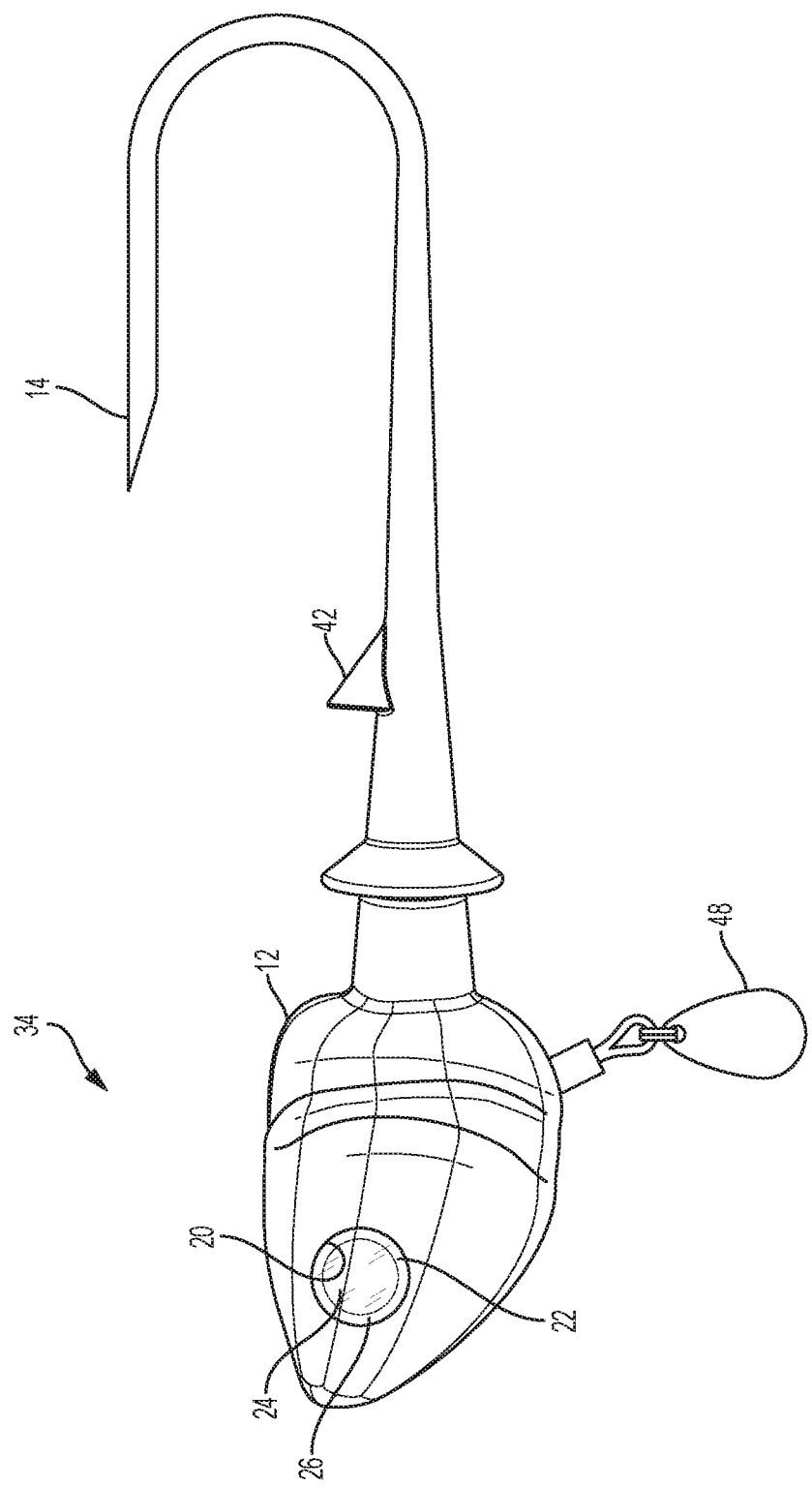
FIG. 10 is a side elevation view of another alternative embodiment of a lure.
Figure 11:
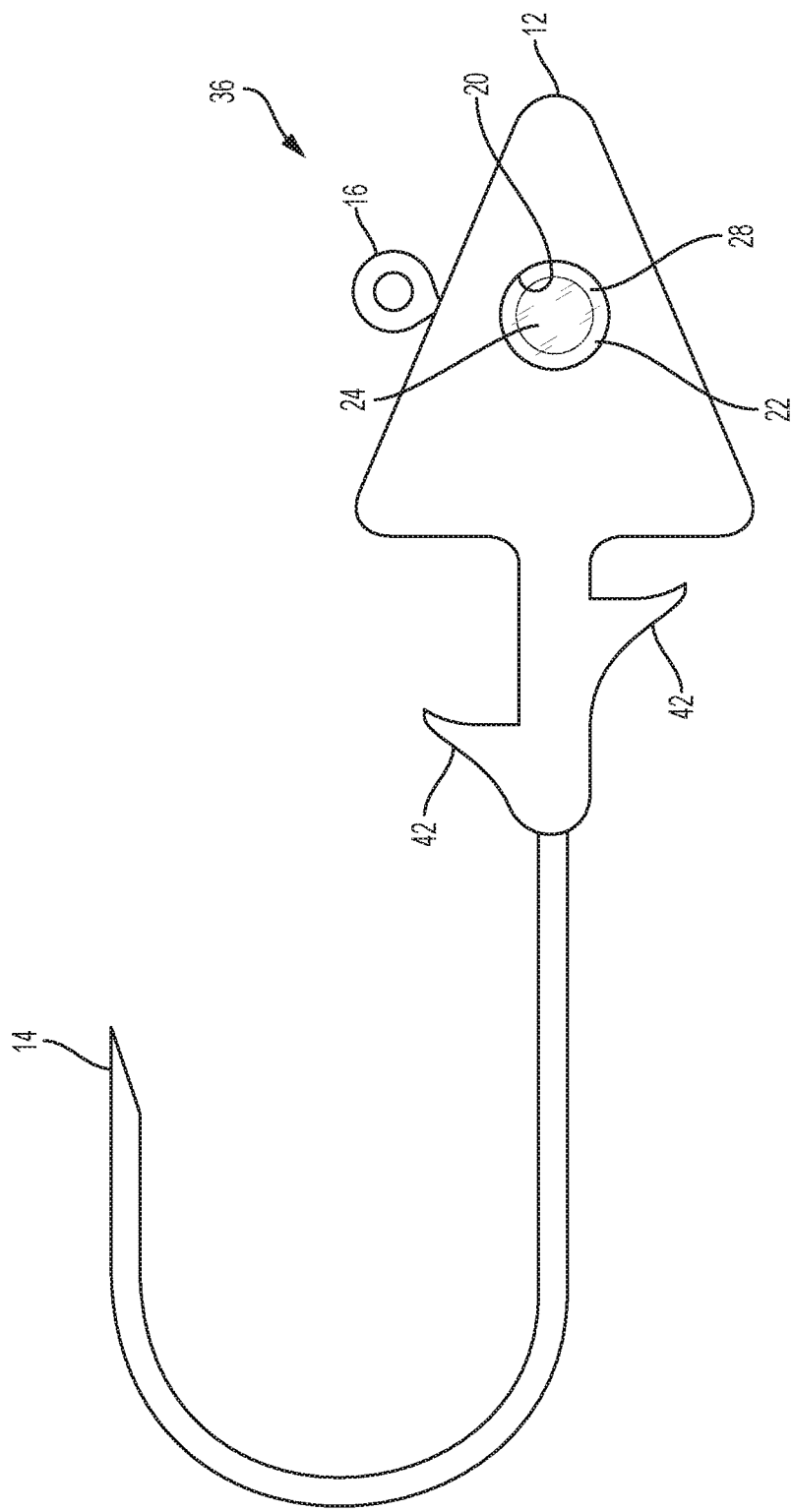
FIG. 11 is a side elevation view of another alternative embodiment of a lure.
Figure 12:
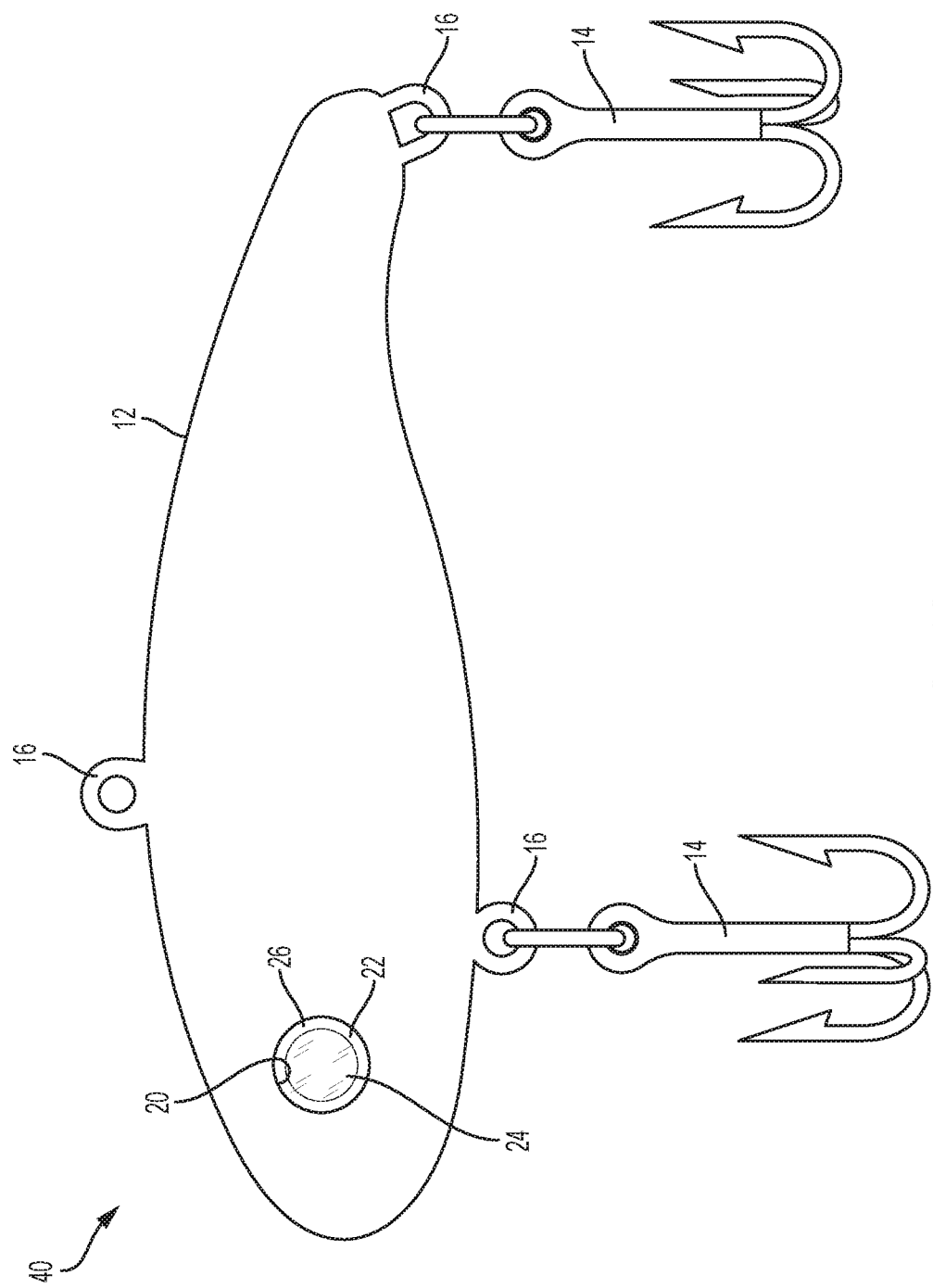
FIG. 12 is a side elevation view of another alternative embodiment of a lure.
Figure 13:
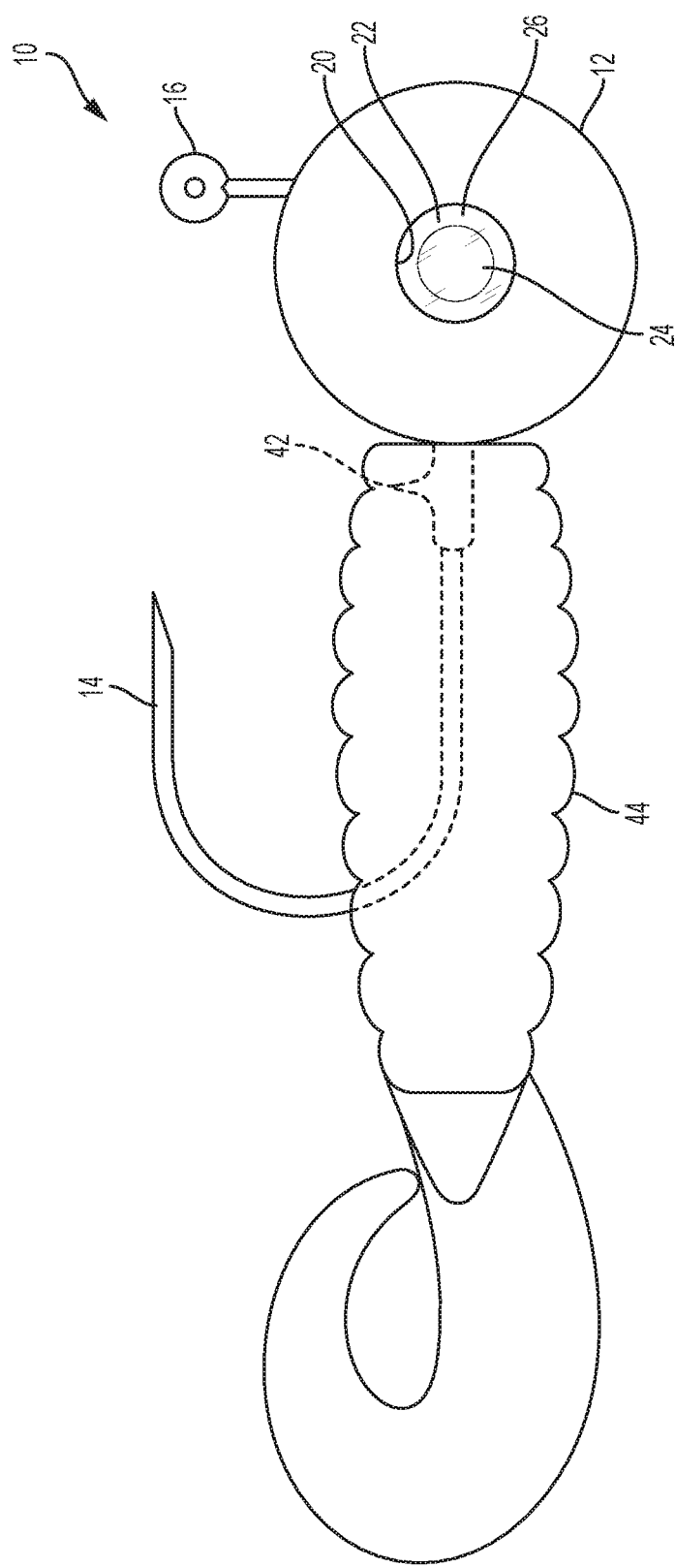
FIG. 13 is a side elevation view of another alternative embodiment of a lure.
Figure 14:
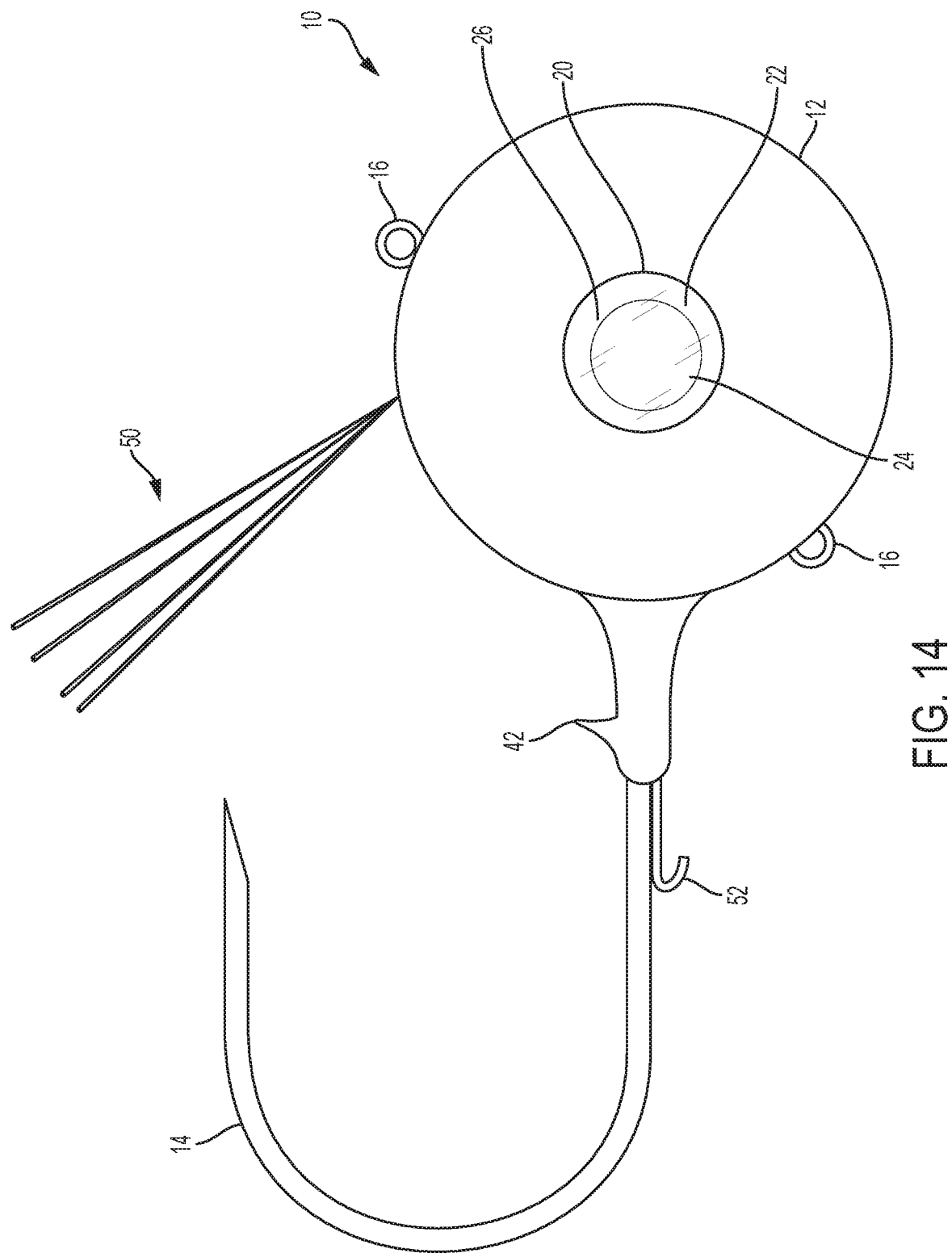
FIG. 14 is a side elevation view of another alternative embodiment of a lure.

Further, the tube 22 and ball(s) 24 can be used with a variety of accessories on lures for example, extra eyelets 16, such as a first and second eyelet as seen in FIGS. 8, 12 and 14 for use in attaching additional hooks, spinner blades, etc.; barbs 42, as seen in FIGS. 9 and 13, which can be used to keep synthetic baits 44 or skirts on the lure 10; a spinner blade 48 or a collar (used for attaching a bass skirt) as seen in FIG. 10, a weed guard 50 and/or a bait hook for keeping live bait on the lure 10 as seen in FIG. 14, etc.

Other fishing tackle with a mechanism to create a rattling sound are known in the art. For example, Southern Pro Tackle, Inc. sells a Rattle Eye Jig. The Rattle Eye Jig has doll eyes affixed to the exterior portion of the jig. The doll eyes have a small black material inside a clear hemisphere. As the jig moves in the water the black material will move around inside the hemisphere making the eye appear somewhat lifelike. However, the Rattle Eye Jig suffers from a number of disadvantages. For example, the doll eyes are applied to the surface of the jig and are therefore susceptible to being broken off during use, e.g. fish strikes or by contacting something hard. By way of another example, due to the small size of the black material and small interior cavity of the eye, the sound generated is not optimized.

In fact, the design of the Southern Pro Tackle, Inc., Rattle Eye Jig was expressly disparaged in United States Patent Publication Number 2013/0152450. The 2013/0152450 Publication stated that "plac[ing] the noise-making device on the jig-head [leads] to easy breakage or snagging and impedes the ability to attach bait to the hook." Instead, the 2013/0152450 Publication describes using a plurality of free-moving beads inside a rigid tube located inside the body of the lure. The 2013/0152450 Publication does not teach using the interior tube to make a lure look more lifelike and, as described above, expressly rejects such a design.

To make a lure 10 with a tube 22 and ball(s) 24 such as seen in FIG. 1, a jig, an eyelet 16 and hook 14 are placed into a mold. The mold has projections to create the hole 20 in the formed body 12. The mold is then filled with a material to make the lure 10, in one embodiment a jig. One type of material used with lures is lead, however other materials can be used, e.g. stainless steel, plastics, tungsten, etc., without defeating the spirit of the invention. In one embodiment an injection molding technique is used, however other molding techniques known in the art can be used, e.g. blow molding, compression molding, etc., without defeating the spirit of the invention.

In some embodiments it is desired to coat the lure 10 with a paint, epoxy, enamel or other coating. For example, if a lead material is used, it may be desirable to coat the lure 10 so that handling by a user would not result in lead poisoning. Coating the lure 10 can also increase the strength and longevity of the lure. Further, some fish can see and are attracted to colors more than others. In such instances, the hole 20 is plugged and the lure 10 is painted. In one embodiment, the lure 10 is dipped into an epoxy four times. After each time the lure 10 is dipped into epoxy, the lure is hung to dry. Epoxy could be applied to the lure 10 in a number of known techniques, e.g. spray coating, and the number of applications could be varied depending on the desired finish and material used without defeating the spirit of the invention.

In one embodiment, the tube is made by taking hot glass in a tube shape and placing a first end into a first mold to seal and form a hemi-spherical end at the first end. The hot glass in a tube shape is then cut and one or more balls 24 are placed in the tube. A second mold is placed on top of the second or cut end. Pressure is then applied to the second mold to seal and form a hemi-spherical end at the second end. [yes] In some embodiments, it may be desirable to have both the first end and second end to be generally symmetrical and look the same. This makes the lure look like it is higher quality and can be sold for increased pricing. Colored glass or glass could also be used without defeating the spirit of the invention.

After the lure 10 has been painted or coated, the plug can be removed from the hole 20 and adhesive applied to the hole, e.g. glue, epoxy, etc. The tube 22 is inserted into the hole such that the lure is generally centered on the tube. In some embodiments, the adhesive may be light activated, which case the adhesive would be exposed to an ultraviolet light.

The above described process results in a high quality lure 10. The tube 22 is created with high uniformity and low variance such that there is sufficient space to place the tube in the hole 20, but not so much space that the tube is prone to falling out or being dislodged during use.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A lure comprising:
a body with a hole formed therein;
a hook connected to the body;
an eyelet connected to the body;
a tube with a first end and second end, the tube positioned in the hole such that the first end is located on a first side of the body and the second end is located on a second side of the body; and
a first ball and a second ball located inside the tube;
wherein the first ball creates a noise and vibration when the first ball contacts the first end;
wherein a longitudinal axis of the tube is generally perpendicular to a longitudinal axis of the hook;
wherein the first ball is visible through the tube and the second ball is not visible through the first end of the tube when the first ball is located near the first end; and
wherein the second ball is visible through the tube and the first ball is not visible through the second end of the tube when the second ball is located near the second end.

2. The lure of claim 1, wherein the tube has an interior cavity and a diameter of the first ball is sized generally the same as the interior cavity.

3. The lure of claim 1, wherein the tube is made from a material that permits light through the material.

4. The lure of claim 1, wherein the first ball and the second ball are sized such that the first ball must remain between the first end and the second ball.

5. The lure of claim 1, wherein the body is coated with at least one material selected from a group consisting of paint, epoxy and enamel.

6. The lure of claim 1, wherein the tube is made from a transparent material.

7. The lure of claim 6, wherein the transparent material of the tube has a first thickness at one of the first end and second end and the transparent material of the tube has a second thickness on a side of the tube and wherein the first thickness is greater than the second thickness.

8. The lure of claim 1, wherein the tube is attached to the body by a light activated adhesive.

9. The lure of claim 1, wherein the hook is made from a first piece of material and the eyelet is made from a second piece of material.

10. A lure comprising:
a body with a hole formed therein;
a hook connected to the body by a shank;
an eyelet connected to the body;
a tube made from a transparent material with a first end and second end, the tube positioned in the hole such that the first end is visible from a first side of the body and the second end is visible from a second side of the body;
a first ball located inside the tube; and
a second ball located inside the tube, wherein the first ball and the second ball are sized such that the first ball must remain between the first end and the second ball;
wherein the first ball creates a noise and vibration when the ball contacts one of the first end and second end; and
wherein the first ball is visible through the tube when the ball is located near one of the first end and second end.

11. The lure of claim 10, wherein the tube has an interior cavity and a diameter of the ball is sized generally the same as the interior cavity.

12. The lure of claim 10, wherein the body is coated with at least one material selected from a group consisting of paint, epoxy and enamel.

13. The lure of claim 10, wherein the transparent material of the tube has a first thickness at one of the first end and second end and the transparent material of the tube has a second thickness on a side of the tube and wherein the first thickness is greater than the second thickness.

14. The lure of claim 10, wherein the tube is attached to the body by a light activated adhesive.

15. The lure of claim 10, wherein the hook is made from a first piece of material and the eyelet is made from a second piece of material.

16. The lure of claim 10, wherein the tube is made from a material that permits light through the material.

17. The lure of claim 10, wherein a longitudinal axis of the tube is generally perpendicular to a longitudinal axis of the shank.

* * * * *